UNITED STATES PATENT OFFICE.

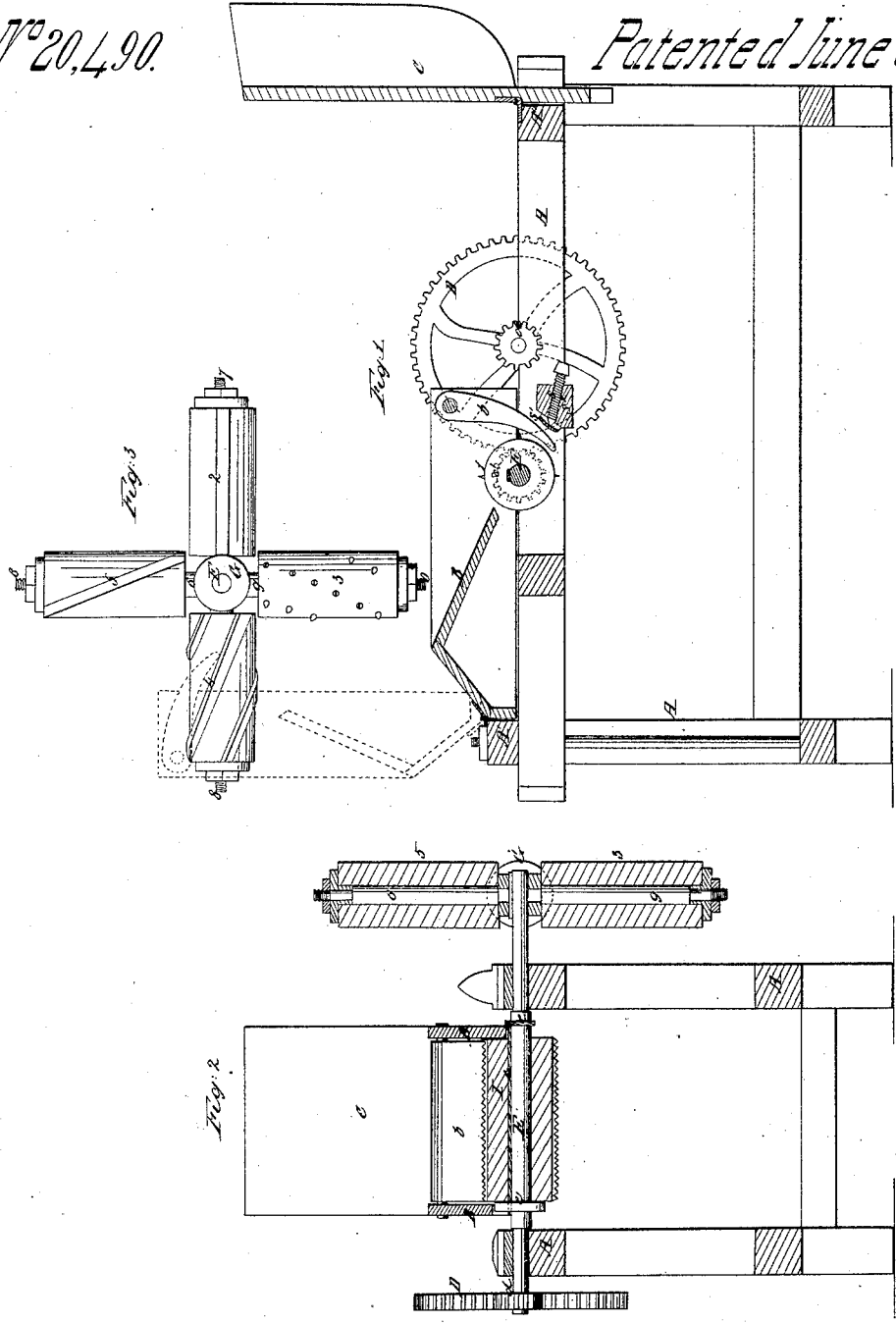

FRANKLIN B. HUNT, OF RICHMOND, INDIANA.

MACHINE FOR GRINDING AND CUTTING.

Specification of Letters Patent No. 20,490, dated June 8, 1858.

*To all whom it may concern:*

Be it known that I, FRANKLIN B. HUNT, of Richmond, in the county of Wayne and State of Indiana, have invented a new and useful Improvement in Machines for Cutting Straw, Grinding Apples, Shelling Corn, or Slicing Vegetables; and I do hereby declare that the following is a full, clear, and exact description of the same, reference being had to the accompanying drawings, forming a part of this specification, in which—

Figure 1, is a vertical longitudinal section of a machine constructed with my improvements. Fig. 2, is a vertical transverse section of the same. Fig. 3, is a detached side view of the fly wheel.

Similar letters of reference in each of the several figures indicate corresponding parts.

My invention embraces the arrangement, in the same machine, of the two peculiarly constructed hinged adjustable troughs, spring set bar and cutter or grinder shaft with spring key and radial arms as presently set forth whereby a machine is provided in which the operations of cutting straw, grinding apples, shelling corn or cutting or slicing vegetables can be performed separately and at different periods without the necessity of using but one frame, one grinder, cutter, or sheller cylinder shaft and but slight adjustment of the operative parts, and while either of said operations is being accomplished, the cutting, slicing, shelling or grinding cylinders not in use can be employed and rendered available as a fly or balance wheel and by thus being made to serve this purpose kept always conveniently at hand and so as not to be liable to get misplaced or be stolen.

To enable others, skilled in the art, to make and use my invention, I will proceed to describe its construction and operation.

A, A′, A″, constitute the framework of my machine; formed of wood or other suitable material, and permanently framed together as shown.

B, is a trough hinged to cap A′. It answers both the purpose of hopper for the reception of fruit and vegetables; and also receives the adjustable concave $b$. Its shape and construction are fully shown in the drawing.

$b$, is a concave whose shape is shown in Fig. 2. It is pivoted on screws at its upper end and adjusted by a screw $s$, in the framework of the machine acting upon its lower extremity. It is also pressed up by the spring $s'$, in shelling corn.

C, is a hinged cutting box of any of the ordinary forms; its position when not in use is shown in Fig. 1. It is hinged to the bar A″, as in Fig. 1. Or it may be made with slides to slide directly back; and may then be used to contain vegetables or fruit to be cut or ground in box B.

D, is a toothed wheel that communicates motion to shaft E, by contact with pinion $d$. It receives its impulse from a crank.

E, is a shaft placed transversely upon the machine and secured in proper boxings about equidistant from each end. Between the frame it receives any one of the cylinders 1, 2, 3, 4, 5. Upon its outer end it receives any four of the five cylinders 1, 2, 3, 4, 5, upon four arms 6, 7, 8, 9. This contrivance answers the purpose of a fly or balance wheel; besides the cylinders are always with the machine, without danger of loss or misplacement.

$e$, is a key and collar combined, and is formed thus: The body of the key is formed as usual, but at one end it is abruptly shouldered down to a round tenon, to the other end is attached a spring collar. This collar is open, one of its ends is armed with a stud pointing inward, which, when the key is in its place, falls into a corresponding hole in shaft E, as shown, the other is firmly fixed to the end of the key.

$e'$, is a collar upon shaft E, it has a hole which receives the round tenon of key $e$.

G, is a hub upon the shaft E, retained by a screw and nut. It has four arms 6, 7, 8, 9, upon which are borne or carried any four of the cylinders 1, 2, 3, 4, 5. These cylinders are also kept in place by nuts and screws.

Cylinders 1, 2, 3, 4, 5, are all of equal length, being in a working machine ten inches long and of equal diameters. No. 1, is used for grinding apples, its periphery is divided into four equal parts by four serrated plates, which are let into the cylinder until the teeth only project. No. 2, has two knives placed on opposite sides, they are formed and set as shown. It is used for cutting cabbage and other vegetables. No. 3, is used for slicing vegetables after they have been subjected to the blades of 2, it has four rows of blades placed spirally across its surface. No. 4, is a corn sheller. It has four plates slightly spiral upon its surface.

These plates are turned up at one edge so as to act upon and shell the corn. No. 5, has two blades on opposite sides and serves for cutting straw. A rim or band may be placed around upon the out ends of these cylinders; and the arms 6, 7, 8, 9, made removable with heads on the outside of this rim and the inner ends screwed into the hub G.

$s$, is a screw in a transverse bar $s^2$ which is situate nearly midway at the top of the frame. This screw is used to destroy or obviate the elasticity of spring $s'$, when it is desirable to have the concave $b$, free from springing as in grinding apples or slicing vegetables. It is also used as a set screw to bring the concave $b$, nearer the cylinder. This renders the removal of spring $s$, unnecessary.

What I claim as my invention and desire to secure by Letters Patent, is—

The arrangement, in the same machine, of the two peculiarly constructed hinged adjustable troughs or boxes B, C, $b$, spring set bar $s$, $s'$, $s^2$, and cutter or grinder shaft E, with spring key $e$, $e'$, and radial arms 6, 7, 8, 9, substantially as and for the purposes set forth.

F. B. HUNT.

Witnesses:
 JOHN FINLEY,
 GEO. TAYLOR.